INVENTOR.
Le Roy R. Boggs
BY
Sylvester & Leehny

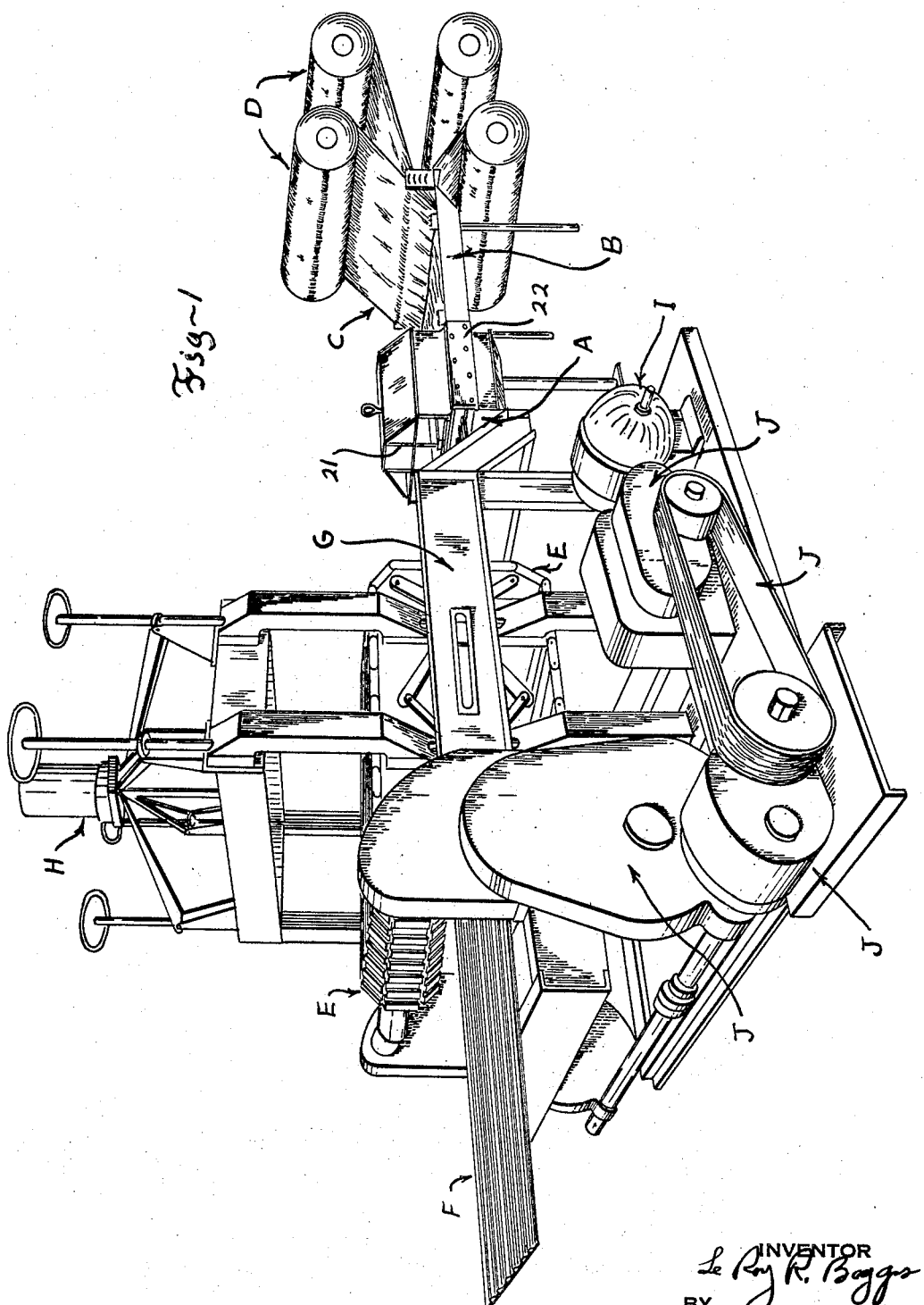

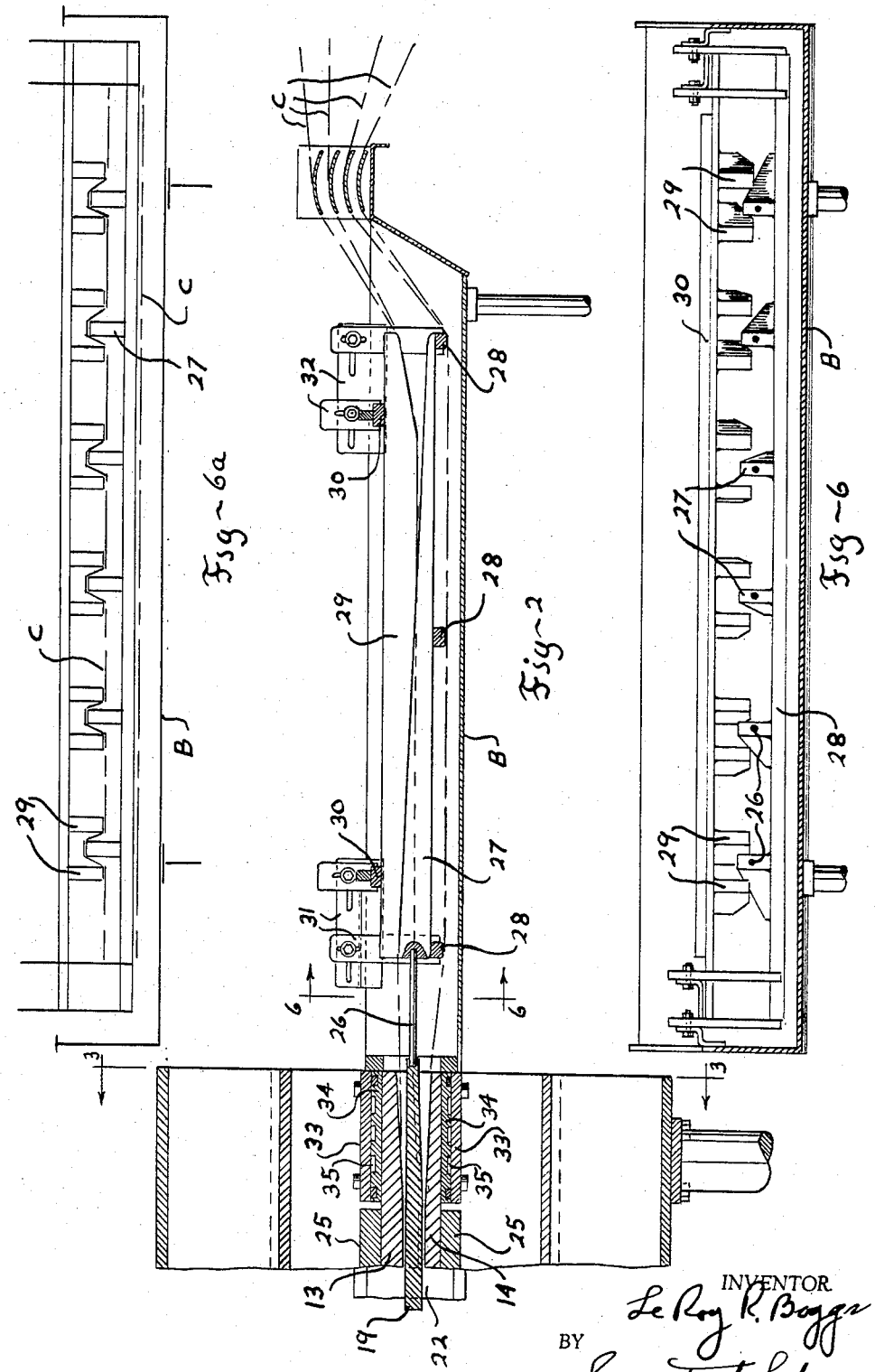

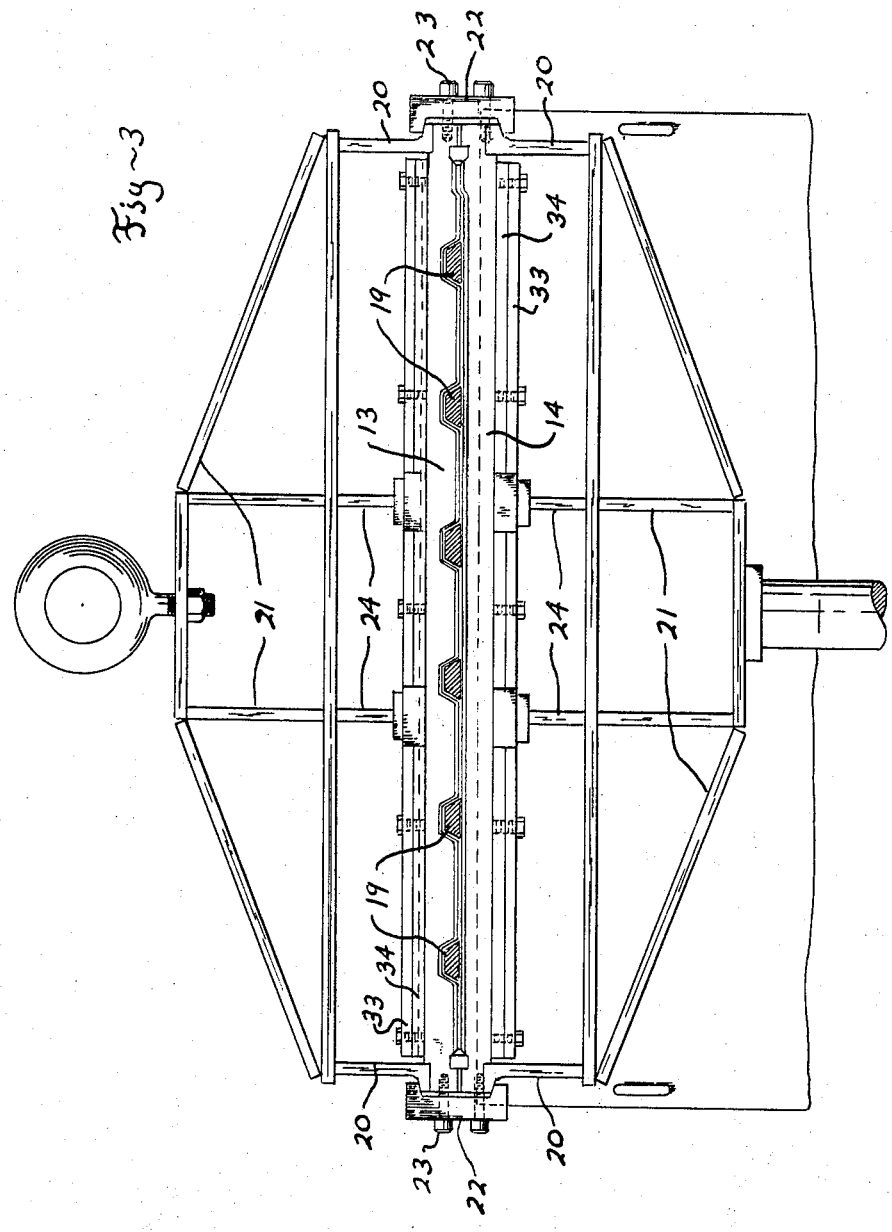

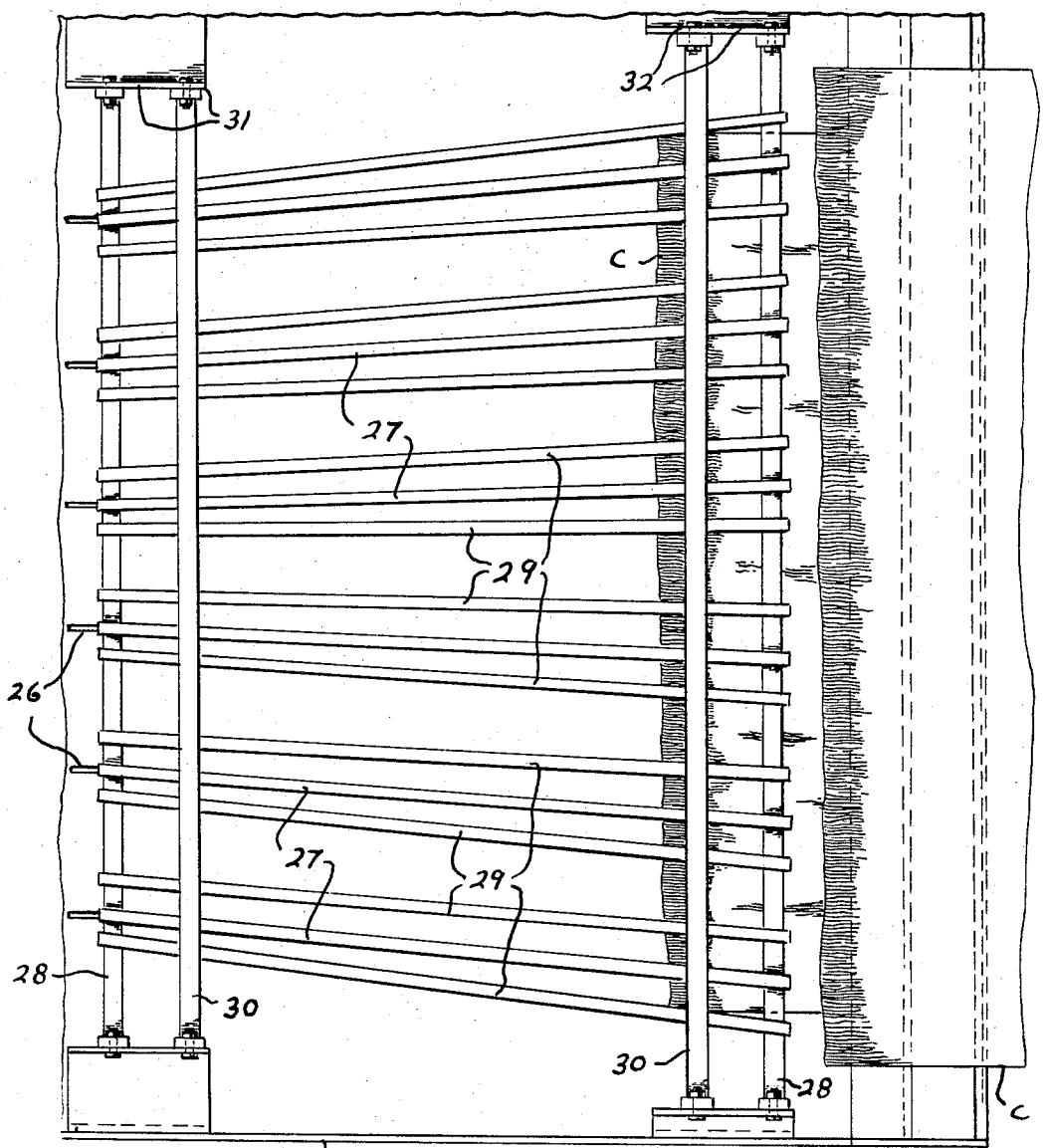
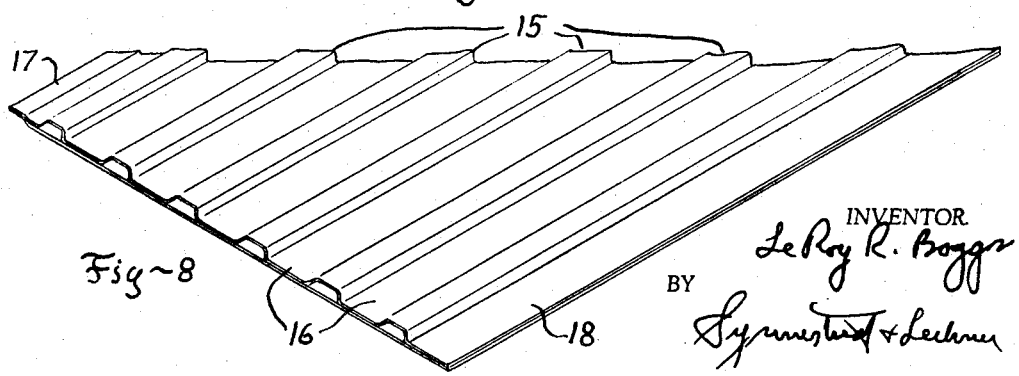

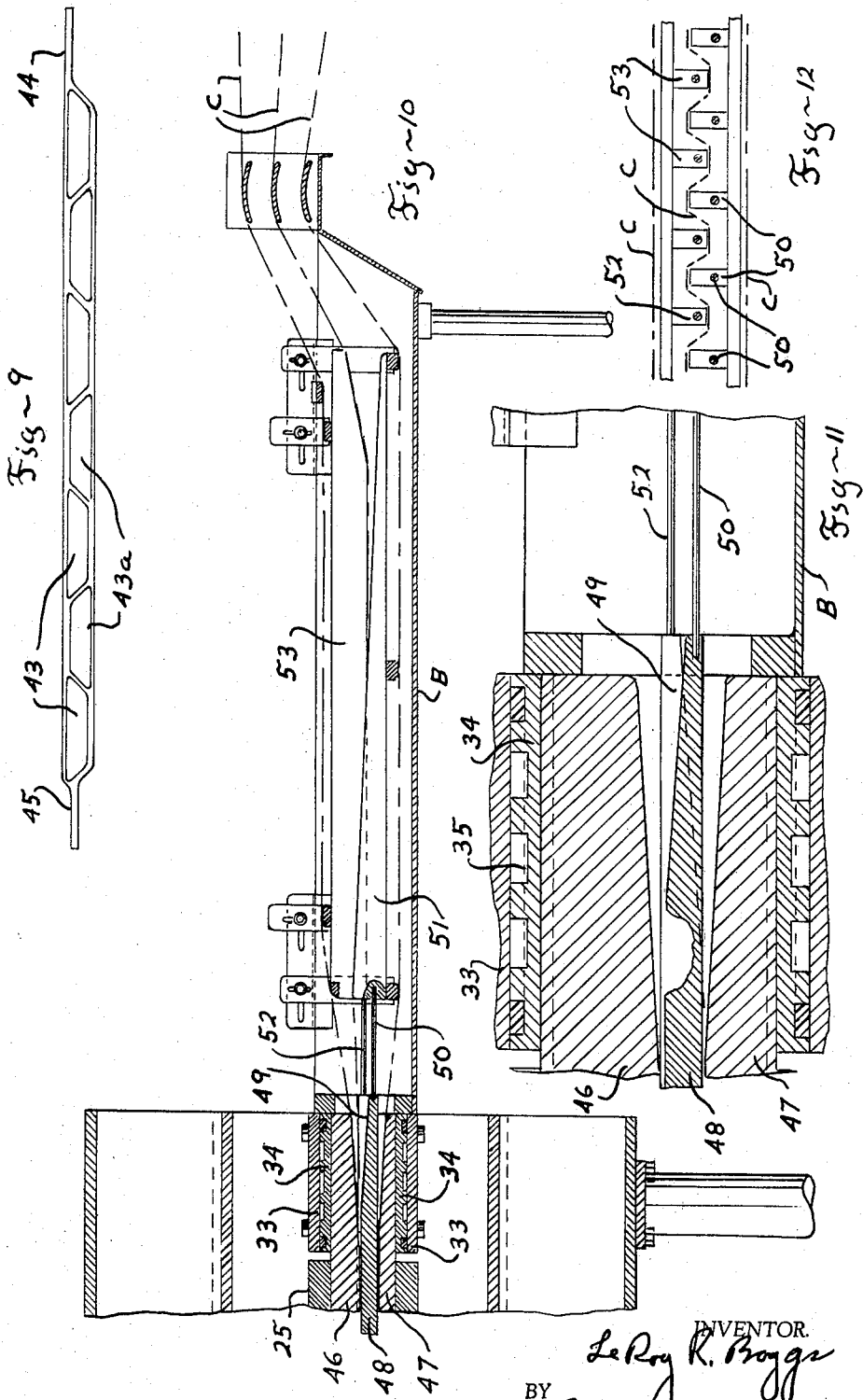

3,378,428
APPARATUS FOR MAKING FIBER REINFORCED RESIN ARTICLES WITH HOLLOW CHANNELS THERETHROUGH
Le Roy R. Boggs, Bristol, Tenn., assignor, by mesne assignments, to Koppers Company, Inc., Pittsburgh, Pa., a corporation of Delaware
Filed July 7, 1964, Ser. No. 380,793
11 Claims. (Cl. 156—462)

ABSTRACT OF THE DISCLOSURE

Apparatus for making fiber reinforced resin articles in sheet form having hollow channels extending lengthwise of the sheets includes a die structure having a forming and resin curing passage, with core members arranged in the die. Folding means positioned ahead of the die fold sheets of resin impregnated webs to certain contours before the folded sheets enter the forming passage of the die and are bonded to flat sheets passing through the die simultaneously.

---

This invention relates to the production of fiber reinforced resin articles and particularly with apparatus for making such articles, especially in sheet form, having hollow channels extended therethrough. The invention is especially concerned with equipment for making continuous lengths of such articles in which the hollow channels extend lengthwise of the article.

The invention is of especial utility in the production of such articles from thermosetting resin materials reinforced with glass fiber reinforcements.

In my copending application Ser. No. 115,633, filed June 8, 1961, there is disclosed a technique for producing fiber reinforced resin articles according to which the fiber reinforcements are impregnated with a liquid thermosetting resin and in which the impregnated reinforcements pass through a confining or forming passage in which the resin is heated to solidify the article, the materials and the formed article being drawn through the system by means of puller mechanism engaging the solidified article beyond the discharge end of the forming passage. The present invention is concerned with apparatus operated according to the general technique just referred to but arranged in a special manner to facilitate the production of certain types of articles having interior hollows or channels, and most especially relatively wide sheet type of products produced on a continuous basis, i.e., in continuous lengths, and having a plurality of hollow channels extended lengthwise therethrough.

In accordance with the invention, the sheet type of article or product is made up by employment of sheet or web type of fiber reinforcement elements, the apparatus including means for impregnating the reinforcement webs preferably with liquid heat or thermosetting resin material, a die structure having a forming passage therein substantially conforming with the external cross sectional shape of the article being made, core members arranged in the forming passage to define interior hollows or channels within the piece being made, and folding means located upstream of the forming passage for folding the reinforcement webs to certain contours adapted to enter the forming passage in certain relationships to the core members therein.

According to the invention, the core members in the forming passage are in effect "floating," in the sense that they are laterally positioned at least in large part by the feed of resin impregnated reinforcement webs between the core members and the walls of the forming passage itself, or between adjacent core members, the core members being tethered or anchored between reinforcement webs being fed through the system, preferably by connection with the downstream end of the folding means for the reinforcement webs.

In accordance with another aspect of the invention, provision is made for facilitating the desired heating and also cooling of certain parts of a forming device of the kind referred to adapted for the production of sheet type articles. Moreover the invention provides special means for buttressing the mid region of the forming members employed for defining the sheet type forming passage, and thereby prevent spreading or bulging of the forming members in the mid region thereof under the influence of the interior pressures developed in operation. Still further the invention provides special means for securing forming members together in position to define the sheet type forming passage, for purposes similar to those just referred to.

How the foregoing and other objects and advantages are attained will appear more fully from the following description referring to the accompanying drawings in which:

FIGURE 1 is an overall perspective view of equipment according to the invention for producing a certain type of sheet product or article having longitudinal channels or interior hollows therein;

FIGURE 2 is a fragmentary vertical sectional view through the entrance end of a forming device for making a sheet type product in accordance with the invention, this view also showing the resin impregnation means, the core members in the forming passage and the means for folding reinforcement webs upstream of the forming passage;

FIGURE 3 is a transverse view on the scale of FIGURE 2, taken substantially as indicated by the line 3—3 on FIGURE 2, but illustrating the core members in section at the zone of their maximum sectional dimensions;

FIGURE 6 is a transverse sectional view taken as indicated by the line 6—6 on FIGURE 2;

FIGURE 6a is a somewhat diagrammatic view similar to FIGURE 6 but illustrating the manner in which the folding elements act on the reinforcement web to effect folding thereof;

FIGURE 7 is a plan view of the resin reservoir and folding devices shown in FIGURES 2 and 6;

FIGURE 8 is a fragmentary isometric view of a portion of a sheet type article made by the equipment illustrated in FIGURES 1 to 7 inclusive and having a series of spaced hollow channels therein;

FIGURE 9 is an end elevational view of an alternative form of sheet type article in which a series of longitudinal channels are provided, being arranged adjacent to each other instead of in spaced relation as in FIGURE 8;

FIGURE 10 is a view similar to FIGURE 2 but illustrating equipment for use in producing an article such as shown in FIGURE 9;

FIGURE 11 is an enlarged fragmentary vertical sectional view of the entrance end portion of the forming device of FIGURE 10; and FIGURE 12 is a somewhat diagrammatic view similar to FIGURE 6a but illustrating the pattern of folding certain reinforcements in accordance with the embodiment shown in FIGURES 9 to 11 inclusive.

Figure 5:
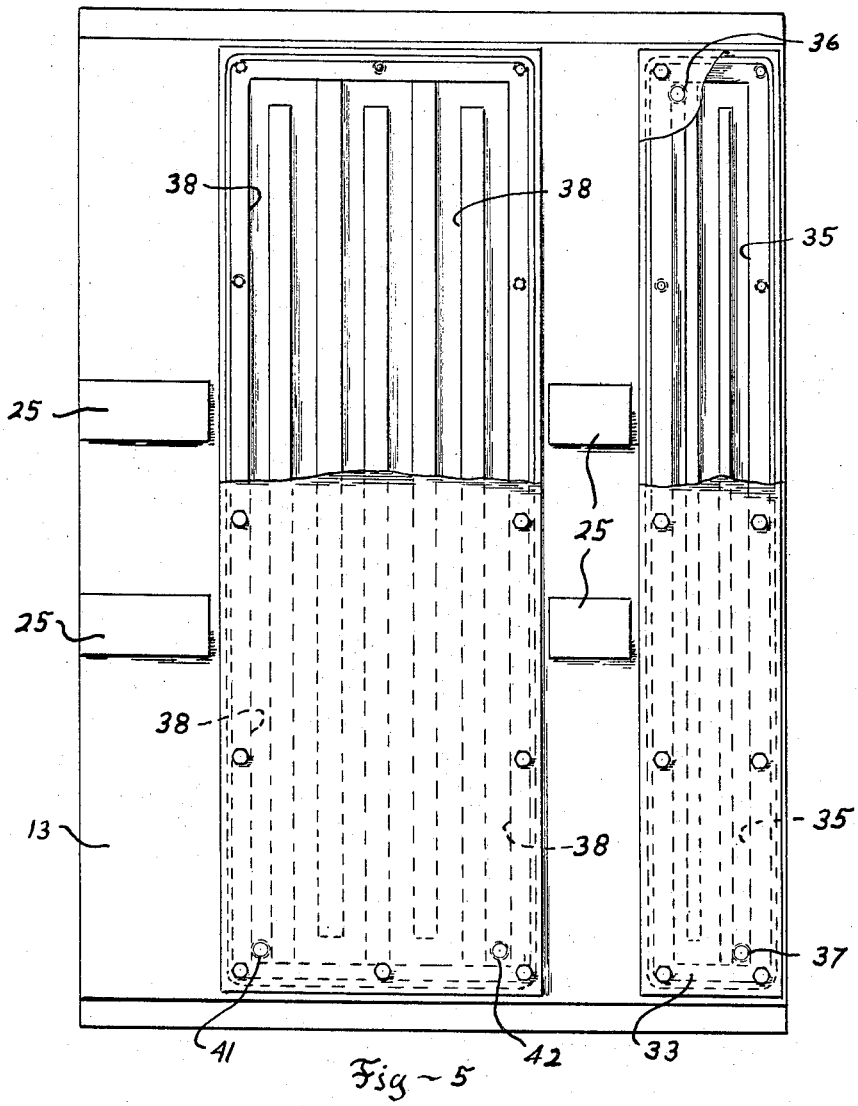
FIGURE 5 is a plan view of the upper forming device shown in FIGURES 2 and 4.

The general arrangement of the equipment is indicated in FIGURE 1 and with reference to that figure a generalized description is here given of the major components of the equipment. Thus, the forming device is indicated at A, this device, as will appear in greater detail herebelow, having a forming passage therethrough substantially conforming to the external cross sectional shape of the article being made. Upstream of the forming device A is a resin pan B adapted to contain a charge of liquid resin material, such as polyester type laminating resin in liquid stage, adapted to be hardened or thermoset by the application of heat in the forming passage of the forming device A.

Reinforcement webs C are fed from supply rolls indicated at D through the resin pan B and at least certain of the webs C are also passed through what is herein referred to as a folding means, providing for change in the cross sectional shape in the web to a shape more closely approximating the corrugated shape desired as the web enters the entrance end of the forming passage. Core members are arranged within the forming passage and it is intended that the reinforcement webs be fed in certain regions over the core members. The web must thus be of greater width than the finished sheet and the excess in width, is, in effect, taken up by the folding means which brings the web to the approximate cross sectional shape desired at the entrance end of the forming passage.

Beyond, i.e., downstream of the forming device A (toward the left in FIGURE 1) a puller mechanism is provided, preferably including cooperating crawler tread devices indicated generally at E—E, these crawler tread devices having friction shoes or the like adapted to interfit with and engage the sheet being made, for instance the sheet indicated at F toward the left in FIGURE 1. The crawler treads of the puller mechanism are mounted upon frame structure G and are movable toward and away from each other being shown in FIGURE 1 in somewhat separated position. During operation the crawler treads are adapted to be urged toward each other to engage the article F by pneumatic pressure element H operating through suitable links so as to urge the tread devices into engagement with the article being made and thus provide for pulling of the article from the forming device A and also for advancement of the reinforcement webs and resin into the forming device.

The crawler treads are adapted to be driven by a motor I through various transmission parts such as indicated at J.

The details of construction and operation of the puller mechanism need not be considered herein as that mechanism forms no part of the present invention per se. Further information relating to a puller mechanism of this type will be found in my copending application Ser. No. 142,749, filed Sept. 18, 1961, now Patent 3,151,354.

Turning now to FIGURE 2, attention is first directed to the location of the resin pan B immediately adjacent to the entrance end of the forming device. As seen in FIGURES 2 and 3 the forming device is made up of two forming members 13 and 14 which are relatively separable but which when assembled provide a forming or confining passage therebetwen substantially conforming with the external cross sectional shape of the article being made. The embodiment of the equipment shown in FIGURES 1 to 7 inclusive is adapted to the production of a sheet type article such as shown in FIGURE 8 having hollow longitudinal ribs 15 and intervening flat parts 16, one edge of the sheet 17 being offset from the opposite edge 18 to provide for convenient overlapping of a plurality of such sheets. For the purpose of forming the article shown in FIGURE 8, the die or forming member 14 is substantially flat as will be seen in FIGURE 3, whereas the member 13 has grooves therein conforming with the external contour of the hollow ribs 15. In each group a core member 19 is arranged, these cores being "floating" cores in the sense that they are adapted to be positioned at least in large part by the feed of the impregnated reinforcements through the passages surrounding the cores. Each core 19 is adapted to define the shape of the interior hollow of one of the hollow channels or ribs 15 such as shown in FIGURE 8.

The upper and lower die or forming members 13 and 14 are provided with shouldered edges with which the side members 20 of the buttress frame structures 21 interfit, these side members 20 being provided with inclined surfaces mating with complementary surfaces provided on the flanges of fastening channels 22. Bolts 23 tapped into the edges of the members 13 and 14 serve to draw the channels 22 inwardly and thus tightly clamp the forming members 13 and 14 to each other along the side edges thereof and also clamp the buttress structures 21 thereto. Each of the structures 21 is further provided with central abutments 24 adapted to engage pads 25 provided on the upper and lower forming members 13 and 14, in the region intermediate the edges. By these buttress structures and the connection thereof with the forming members, the forming members are reinforced as against bulging or spreading, especially in the mid region thereof, under the influence of the relatively high pressures which develop in the forming passage during the making of an article. The wedging channel devices 22 also act to tightly clamp the edges of the forming members 13 and 14 together, thereby preventing spreading thereof under the pressure developed in operation.

Turning now to FIGURES 2, 6, 6a and 7, it will be seen that at the upstream end of each core member 19 there is a tether or anchor 26 which serves to prevent the core from moving downstream with the article being formed. Each of the anchors 26 is connected with the downstream end of one of the elements or members 27 of the devices for folding or taking up the excess width of certain of the reinforcement webs as they are being fed to the forming passage. As will be clearly seen from the figures, these folding elements include the series identified by the numeral 27 which are supported from below by transverse supports 28, and also a cooperating series of elements 29 supported by the upper transverse bars 30. The elements 29 are arranged in pairs, one element of each pair lying at opposite sides of one of the elements 27 of the first series. When viewed as in FIGURE 2 it will be noted that the upstream (right hand) end of the elements 27 and 28 are somewhat separated to receive the two upper reinforcement webs C therebetween, whereas toward the left in FIGURE 2, the downstream ends of the elements 27 and 29 interleave or interdigitate as will be seen also from FIGURES 6 and 6a, so that the excess width of the upper reinforcement webs is taken up by a folding action which approaches the cross sectional shape desired at the entrance end of the forming passage. This configuration of the upper webs is indicated by the dash line C applied to the diagrammatic illustration of FIGURE 6a. The two lower webs C as shown in FIGURES 2 and 7 pass beneath the transverse supports 28 and are retained in substantially flat shape in their travel to the entrance end of the forming passage. These latter webs are of smaller width than the upper two, preferably being of substantially the same width as that of the forming passage itself. In this way, referring to FIGURE 8, the article is made up by reinforcement webs which extend all the way across the width of the sheet being formed in the plane of the flat portions 16, the upper reinforcement webs also being positioned in the plane of those portions 16 but extending therefrom up and over the hollow ribs 15.

The vertical and longitudinal positions of the folding elements 27 and 29 may be made adjustable by means of mounting bracket devices such as shown at 31 and 32 having bolt slots and fastening bolts providing for adjustments in the planes referred to.

The resin pan B is adapted to contain a liquid resin material, for instance up to a level somewhat above the entrance end opening of the forming passage between the forming members 13 and 14 so that the reinforcement webs are thoroughly impregnated with the liquid resin as the webs are advanced from the source of supply to the forming passage.

As clearly seen in FIGURE 2, the entrance end portions of the forming members 13 and 14 are flared or tapered to provide an enlarged inlet opening, as compared with the opening somewhat downstream. Similarly the core members 19 are reduced in dimensions toward the upstream ends thereof and in this way the forming passage at all sides of the core members and also between the upper and lower forming members diminishes in cross section from the entrance end inwardly, this being of importance in order to provide a compressing action upon the impregnated reinforcements as they enter the forming passage.

For reasons fully brought out in my copending application Ser. No. 115,633 above referred to it is contemplated to effect cooling of the entrance end portions of the forming members. This is accomplished herein by means of pairs of plate members 33–34 (see FIGURES 2, 4 and 5), the plates 34 being routed out to provide a labyrinth passage 35 closed at the outer side by the plate 33 and serving as a channel for the circulation of a cooling medium such as water which may be introduced into the passage through the opening at 36 and delivered from the passage through the opening at 37.

Figure 4:
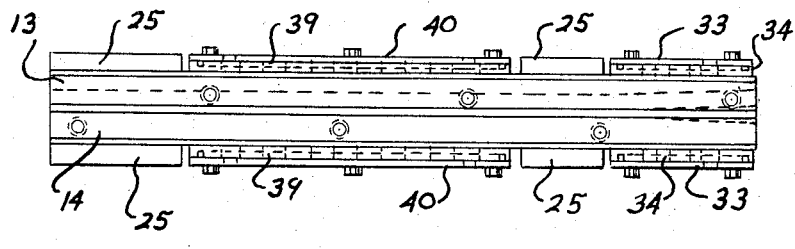
FIGURE 4 is a side elevational view of the forming device a portion of which appears in section toward the left of FIGURE 2.

Similarly, the mid portion of the forming members 13 and 14 is adapted to be heated by a heat transfer medium circulated through labyrinth passages 38 formed in the inner plates 39, these passages being closed by the outer plates 40 and the assemblies being fastened to the upper and lower forming members 13 and 14 in the manner clearly shown in FIGURES 2, 4 and 5. Heating medium such as steam may be introduced into the passage 38 through the opening 41 and may be discharged through the opening 42. This heating means serves to raise the temperature of the resin passing through the forming passage and thereby effect heating or curing of the resin and thus solidification of the article being made.

The arrangement of the cooling and heating means in the form of pairs of cooperating plates which are separable from the forming members themselves is of advantage for a number of reasons including the fact that these same heating and cooling units may be employed with forming members of other shapes, for instance with forming members of shapes referred to hereinbelow in connection with the embodiment illustrated in FIGURES 9 to 12 inclusive, to which reference is now made.

Referring first to FIGURE 9 it will be seen that in contrast to the article of FIGURE 8, the article shown in FIGURE 9 while also being of sheet type, nevertheless has a series of alternating contiguous hollow channels 43 and 43a extended therethrough, rather than the spaced channels 15 of FIGURE 8. The edge portions 44 and 45 of the sheet article of FIGURE 9 are also offset from each other to provide for overlapping mounting of a plurality of such sheets. The sheet shown in FIGURE 9 is of particular advantage as an insulating sheet, for instance for refrigerated containers, vehicles or buildings.

In general, the equipment employed in producing the type of sheet shown in FIGURE 9 is similar to that already described, but with certain changes as mentioned herebelow. The forming members 46 and 47 of the forming device are here both of substantially flat shape, except at the edges where the marginal portions 44 and 45 of the sheet are produced. Moreover, instead of employment of a single series of cores such as indicated at 19 in the first embodiment, the arrangement shown in FIGURES 10 to 12 includes two series of cores 48 and 49 one of which is adapted to produce the hollow channels 43 and the other of which is adapted to produce the alternating hollow channels 43a. The upstream ends of the core members 48 are provided with anchors 50 which connect with the downstream ends of the lower folding elements 51, and the upstream ends of the cores 49 are provided with anchors 52 which connect with the downstream ends of the upper folding elements 53. In this arrangement three reinforcement webs are fed into the resin pan for impregnation therein, the intermediate of such webs being fed between the upper and lower elements 53 and 51, the lower web being fed below the folding elements and the upper web being fed above the folding elements. In this way the three webs take up the positions diagrammatically indicated in FIGURE 12, and upon entrance into the forming passage the intermediate web is corrugated so as to pass over each of the core members 48 and under each of the core members 49. In this way a single reinforcement web lies between each adjacent pair of hollow channels 43–43a throughout the width of the sheet, and at the opposite faces of the sheet alternating areas lying adjacent to the channels 43 and 43a have single and double plies of reinforcement webs therein.

It is contemplated that the intermediate web C shall be of greater width than the upper and lower webs, the excess width of the intermediate web being taken up by the folding action of the elements 51 and 53. The width of the three webs is preferably such that all three webs extend to the extremity of the marginal portions 44 and 45 of the sheet being formed. It will be understood that more than one web may be fed in the position of any or all of the webs indicated at C in FIGURE 10.

As seen in FIGURE 10, the cooling units composed of plates 33–34 as above described have been applied to the forming members 46 and 47.

I claim:

1. Apparatus for making continuous lengths of a fiber reinforced sheet type resin article having interior, spaced-apart, hollow channels extending lengthwise thereof, comprising a forming device having a forming passage therethrough substantially conforming with the external cross sectional shape of the sheet type article being made and adapted to receive heat hardenable resin impregnated fiber reinforcement material in said passage to effect formation of the article therein, a reservoir containing the liquid resin material, means for continuously feeding a plurality of flat sheets of fiber reinforcement materials through the liquid resin material and into the entrance end of the forming passage, means located upstream of the forming passage for folding at least one of said flat reinforcement sheets to a cross sectional contour having flat portions that are contiguous with another one of said sheets and disposed between spaced apart raised portions defining hollow channels extending lengthwise of said article, core members in the forming passage that are disposed in the hollow channels in the article being made, and means for continuously withdrawing the finished article from said forming device.

2. Apparatus according to claim 1 in which the core members are anchored to the folding means.

3. Apparatus for making continuous lengths of a fiber reinforced sheet type resin article having interior, spaced-apart, hollow channels extending lengthwise thereof, comprising a forming device having a forming passage therethrough substantially conforming with the external cross sectional shape of the sheet type article being made and adapted to receive heat hardenable resin impregnated fiber reinforcement material in said passage to effect formation of the article therein, a reservoir containing the liquid resin material, means for continuously feeding at least two flat sheets of reinforcement material through the liquid resin material and into the entrance end of the forming passage, means for guiding a first of said flat reinforcement sheets into the forming passage substantially in a plane, means for folding a second one of the flat reinforcement sheets to a cross sectional contour having flat portions, contiguous with said first sheet, that are disposed between hollow raised portions defining hollow channels extending lengthwise of said article, core members in the forming passage that are disposed in the hollow channels in the article being made, and means for continuously withdrawing the finished article from said forming device.

4. Apparatus for making continuous lengths of a fiber reinforced sheet type resin article having interior, spaced-apart, hollow channels extending lengthwise thereof, comprising a forming device having a forming passage therethrough substantially conforming with the external cross sectional shape of the sheet type article being made and adapted to receive heat hardenable resin impregnated fiber reinforcement material to effect formation of the article therein, a reservoir containing the liquid resin material, means for continuously feeding at least three separate flat sheets of reinforcement materials through the liquid resin material and into the entrance end of the forming passage, means for guiding a first one of the reinforcement flat sheets into the forming passage substantially in a plane at one side of the article, means for guiding a second one of the reinforcement flat sheets in the forming passage substantially in a plane at the opposite side of the article and means for folding a third one of the reinforcement flat sheets into a corrugated cross section and guiding said folded third sheet between said first and said second flat sheets, said folded third sheet having portions extending lengthwise that are alternately contiguous with said first and said second flat sheets thereby forming said hollow channels between said first and second sheets, core members in the forming passage that are disposed in the hollow channels in the article being made, and means for continuously withdrawing the finished article from said device.

5. Apparatus according to claim 4 in which some of the core members are anchored to the guiding means for the reinforcement sheets between the first and second reinforcement sheets and in which other core members are anchored to the guiding means between the second and third reinforcement sheets.

6. Apparatus for making continuous lengths of a fiber reinforced resin article having an interior hollow extended lengthwise thereof, comprising a forming device having a forming passage therethrough substantially conforming with the external cross sectional shape of the article being made and adapted to receive the fiber reinforcement and a liquid resin material to be hardened in said passage to effect formation of the article therein, means located upstream of the forming passage for folding sheet type fiber reinforcements to a cross section approaching that of the article being made and for guiding the folded reinforcements into the entrance end of the forming passage, means for impregnating the reinforcements with the liquid resin material to be hardened in the forming passage, and a core member for defining the interior hollow channel in the article being made, the core member being located in the forming passage and being anchored to the folding means.

7. Apparatus according to claim 4 in which the folding means for the third reinforcement sheet comprises interleaving bars having relatively inclined guide edges, the bars being extended upstream from a region in the vicinity of the entrance end of the forming passage, together with anchor devices connecting the core members with the downstream ends of the folding bars.

8. Apparatus for making continuous lengths of a fiber reinforced sheet type resin article, comprising a forming device including opposed relatively separable members cooperating to define a forming passage therebetween having a cross sectional shape substantially conforming with the cross sectional shape of the article being made and adapted to receive the fiber reinforcement impregnated with a liquid resin material to effect formation of the article, means for continuously feeding the resin impregnated fiber reinforcement material into and through the forming passage, and a frame for backing up at least one of the members of the forming device and having abutment means engaging the forming member in a region intermediate the edges thereof.

9. Apparatus according to claim 8 and further including fastening means for jointly interconnecting the edges of the frame and of the members of the forming device.

10. Apparatus according to claim 9 in which the fastening means comprises a channel element adapted to fit over the edges of the frame and of the members of the forming device, the channel element and said edges having inclined cooperating wedging surfaces for forcing said edges toward each other.

11. Apparatus for making continuous lengths of a fiber reinforced sheet type resin article, comprising a forming device including opposed relatively separable members cooperating to define a forming passage therebetween having a cross sectional shape substantially conforming with the cross sectional shape of the article being made and adapted to receive heat hardenable resin impregnated fiber reinforcement material to effect formation of the article, means for continuously feeding said resin impregnated fiber reinforcement material into and through the forming passage, and fastening means for interconnecting the edges of the separable forming members including a channel element adapted to fit over the edges of said members, the channel element and said edges having inclined cooperating wedging surfaces for forcing said edges toward each other.

References Cited

UNITED STATES PATENTS

| | | | |
|---|---|---|---|
| 2,871,911 | 2/1959 | Goldworthy et al. | 156—441 XR |
| 2,948,649 | 8/1960 | Pancherz | 156—441 XR |
| 2,766,160 | 10/1956 | Bentov. | |
| 2,760,548 | 8/1956 | Dalo | 156—210 |
| 2,576,864 | 11/1951 | Valente | 156—213 XR |
| 2,282,168 | 5/1942 | Cunnington | 156—213 XR |

EARL M. BERGERT, *Primary Examiner.*

P. DIER, *Assistant Examiner.*